Patented Nov. 18, 1941

2,263,000

UNITED STATES PATENT OFFICE 2,263,000

EDIBLE

Harold A. Guetzkow, St. Paul, Minn.

No Drawing. Application October 13, 1938,
Serial No. 234,787

6 Claims. (Cl. 99—90)

My invention relates to edibles consisting of a different character of ingredients yet having a nature wherein the edible portions are in sheet-like formation of any desired size or shape.

It is a feature of my invention to provide an edible of a thin sheet-like character which has been baked and crisped to permit the same to be eaten in thin wafer-like form like some forms of so called bread, and yet my edible is of an entirely different character made up of different ingredients.

My invention includes the method of making an edible consisting of sauerkraut, sugar, salt, lard or similar shortening, flour, and cream, the proportions of which may be varied in accordance with the desired requirements. All of these ingredients are mixed as herein provided, and baked to brown the same on either side as may be desired, thereby providing a wafer-like crisp edible which may be cut into the desired size and shapes so that it may be served for eating.

Further, when the ingredients are properly mixed together, they are adapted to be rolled out to provide a wafer-like form to the edible of a desired thickness.

My method includes the making of an edible which may consist of the ingredients and in the approximate proportions as follows: about one quart sauerkraut which has been properly cured and which is made up of cabbage and which has been treated to make the ordinary so-called sauerkraut, about one teaspoon of sugar, about one-half teaspoon salt, three tablespoons of cream, and about one large tablespoon of lard or similar shortening, together with about two cups of flour. These ingredients are mixed in the following manner: The kraut, sugar, salt, and cream are thoroughly stirred and mixed together, after which I pour over the same the portion of melted lard or shortening, and then stir in the flour. When these ingredients are thoroughly mixed together, I roll them out into a thin wafer-like form in a manner similar to pie crust, either by using an ordinary rolling pin or similar means to roll the same evenly and to the desired thickness. It is then baked in an oven for approximately fifteen to twenty minutes, or until the same is baked to a medium brown color. In the baking, the edible may be turned to bake the same brown on either side, or may be placed in the oven on a perforated tin or grate so as to brown the same on both sides if desired. I find that the most desired heat which the oven should be is from 275° to 300° Fahrenheit.

My method further consists in making an edible which includes the mixing together of sauerkraut, about 28 ounces; sugar, about one-half ounce; salt, about one-eighth ounce; lard, about 1 and three-fourths ounces; flour, about ten ounces; and cream, about one ounce; all of which are mixed in the manner that has been heretofore set forth, and then baked after the same has been rolled out in a thin pie crust like form and after the same has been baked to give the same a brown crisp nature, it may be cut into the desired shapes or forms so that the edible may be conveniently packaged, and in which packages it may be hermetically sealed so that it may be dispensed to the customer in good crisp form.

My kraut crisp may be made even more tasty if it is desired by warming it in the oven before it is served. Thus I provide a very tasty kraut crisp which may be eaten in its wafer-like form dry, or with butter or other dressing as may be desired. Insofar as I know, no edible of this character has ever been made, and I believe my edible is very desirable and offers a new manner in which to serve sauerkraut.

It is apparent that the proportions of my edible may be varied without departing from the scope of the invention, it being essential that the edible be made in a wafer crisp like nature so that it may be readily dispensed and served in a convenient manner. The proportions and ingredients together with the method include that which come within the scope of the following claims.

I claim:

1. A kraut crisp including the ingredients in about the proportions as follows: one quart sauerkraut, one teaspoon sugar, one-half teaspoon salt, one large tablespoon shortening, two cups flour, and three tablespoons cream.

2. An edible consisting of sauerkraut, sugar, salt, shortening, flour, and cream in such proportions as to provide a mass which after being thoroughly mixed may be rolled out into pie crust like thickness, said mass having been baked to a brown crispness to make the same to be served as an edible product.

3. An edible consisting of sauerkraut, about 28 ounces; sugar, about one-half ounce; salt, about one-eighth ounce; lard, about one and three-fourths ounces; flour, about ten ounces, and cream, about one ounce; the sauerkraut being thoroughly mixed first with the sugar, salt and cream and then poured over the melted lard, and thereafter adding the flour, and after thoroughly mixing, rolled out and baked in an oven from fifteen to twenty minutes to the desired crispness.

4. The method of making an edible consisting in mixing about 28 ounces of sauerkraut with one-half ounce of sugar, one-eighth ounce of salt, and one ounce of cream, thoroughly mixing the same, then pouring over and mixing into the same about one and three-fourths ounces of melted lard, after which mixing in about ten ounces of dry flour, and when the same is thoroughly mixed together, rolling the mass out into a wafer-like form and then baking in an oven heated to from 275° to 300° Fahrenheit until the wafer is thoroughly crisped and browned on either side.

5. The method of making an edible having its principal ingredient consisting of sauerkraut (finely cut cabbage which has been allowed to ferment in a brine made with its own juice and salt); first thoroughly mixing with the sauerkraut, sugar, salt, and cream; then mixing therewith melted shortening, after which dry flour is thoroughly mixed with the same; then rolling out the mass in thin sheet-like form; and then baking the same to a brown crisp nature to provide a dry wafer-like kraut edible.

6. The method of making an edible consisting in mixing about one quart of sauerkraut with about one teaspoon of sugar and the desired amount of salt together with three to four teaspoons of thick cream; thoroughly mixing the same; and then adding melted shortening, the proportion of salt being regulated by the shortening used; then mixing a sufficient quantity of dry wheat flour to make the mass workable so that it may be rolled out like pie crust; and after the same has been rolled into sheet-like form, then baking to a crispness desired to provide a kraut crisp which is in wafer-like form and which may be served with butter.

HAROLD A. GUETZKOW.